L. A. SCRIBNER.
COUPLING.
APPLICATION FILED DEC. 7, 1911.
1,045,199.
Patented Nov. 26, 1912.
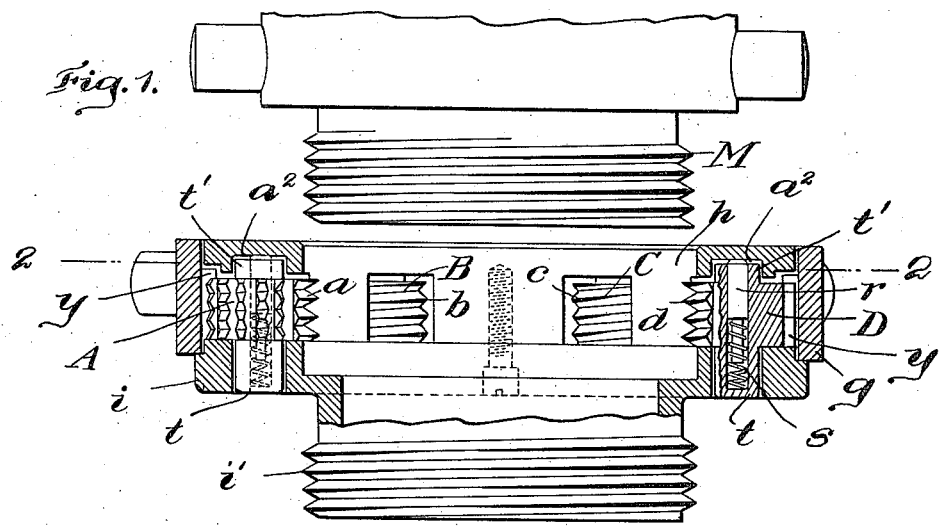
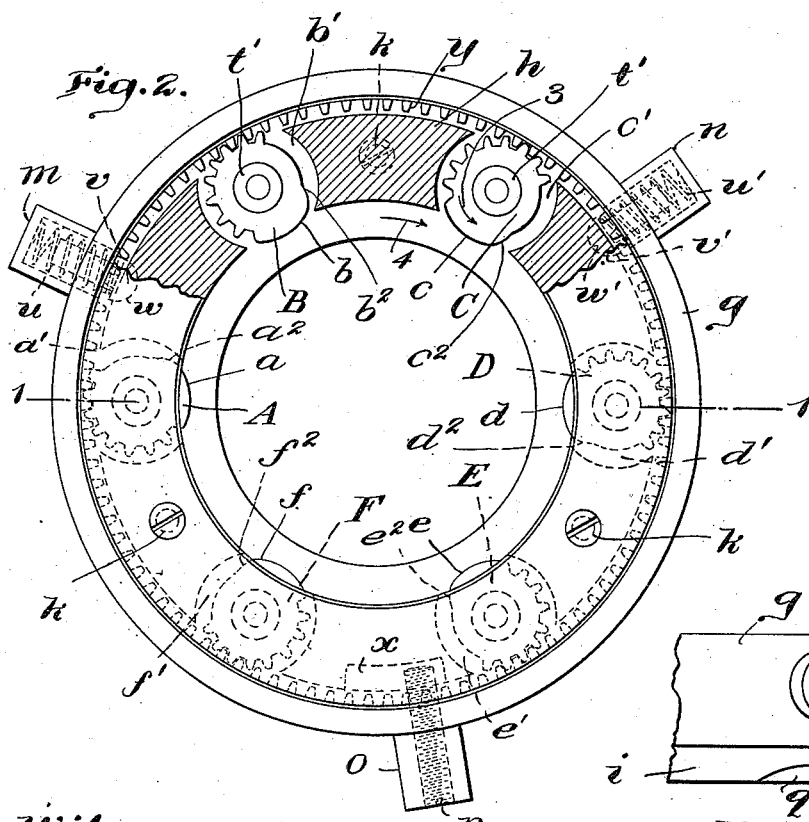

UNITED STATES PATENT OFFICE.

LEON A. SCRIBNER, OF NEWPORT, NEW HAMPSHIRE.

COUPLING.

1,045,199.  Specification of Letters Patent.  Patented Nov. 26, 1912.

Application filed December 7, 1911. Serial No. 664,453.

*To all whom it may concern:*

Be it known that I, LEON A. SCRIBNER, a citizen of the United States, and resident of Newport, in the county of Sullivan and State of New Hampshire, have invented new and useful Improvements in Couplings, of which the following is a specification.

My invention relates to couplings for screw threaded pipe or hose connections, and has for its object the provision of a coupling member which is quickly and securely attachable and readily detachable in its coöperation with a complemental coupling member which may consist of the ordinary screw-threaded end.

One of the objects of this invention is thus the provision of a quick acting coupling member adapted to coöperate with the ordinary standard threaded pipe and hose coupling ends.

Contrivances have been proposed in which threaded grippers or "dogs", movably mounted in a hose-coupling member, have engaged the threads of an inserted threaded complemental coupling member by radial movement, or movement in which the radial component predominated over the tangential component, and in which the movement of parts for engagement was affected by no provision for preventing opposition of threads, top to top, except relative turning movement of the entire coupling members, to "feel" for the right position for engagement.

My invention is characterized by the functional performance of threaded grippers or bolts which intrude their threads or equivalent ridges between the threads of a complemental coupling member by a true tangential and progressive movement, the leading ends of the bolt threads first entering the groove between threads of the complemental member and being followed by the remainder of the bolt thread. The effect of this characteristic movement is to tend to rotate the complemental coupling member automatically and by the act of intruding the bolt-threads, in such direction that, if the engaging threads happen to meet in disadvantageous opposition, the tendency is to shift the relative positions of the threaded engaging members so as to repair or correct the disadvantage.

Other characteristics of my invention will appear from the following description of an example of my invention, illustrated by the accompanying drawings, in which,—

Figure 1 represents a longitudinal section of a pipe coupling member taken along the line 1—1 of Fig. 2; Fig. 2 is a plan view of the same coupling, partly broken away and shown in section at the line 2—2 of Fig. 1; and Fig. 3 is a fragmentary detail showing a portion of the operating ring in its relation to the other parts of the coupling member.

The specific example of my invention shown in the drawings represents a coupling member suited to attachment to a hose or pipe; the characteristic mechanical and functional factors may, however, be applied to analogous purposes and embodied for instance, in a cap for a hydrant, in which case, instead of being provided with a longitudinal through passage, the coupling member would be closed.

The main body of my improved coupling member consists of the annulus $i$ which in the illustration shown in the drawings comprises a threaded coupling end $i'$ adapted to be secured to a complemental coupling member in the usual manner. Thus, this coupling member is adapted to be attached to the internally threaded end of a hose. The annulus $i$ is perforated at preferably regular intervals about its flange so as to form seats or bearings for the trunnions $t$ which form parts of rotatably mounted bolts presently to be described. A ring $h$ which I term the cage is secured to the flange of the annulus $i$ as by screws $k$. The annular cage $h$ has formed in it a number of recesses which are generally speaking cylindrical in form but which extend through the annular body of the cage $h$ and correspond in number and position to the apertures formed in the flange of the annulus $i$. Cylindrical sockets $a^2$ concentric with these cylindrical recesses or chambers are formed and so disposed that when the cage $h$ is secured to the annulus $i$ these sockets will register axially with the apertures in the flange of the annulus $i$. The recesses or chambers in the cage are marked $a'$, $b'$, $c'$, $d'$, $e'$, $f'$, (Fig. 2). In each of these chambers there is lodged a rotatable block which I term a bolt, the bolt being provided with trunnions t, t', which find their bearings in the apertures and sockets in the annulus i and cage h respectively. These rotatable bolts are marked A, B, C, D, E, F, (Fig. 2), and are, generally speaking, cylindrical in form but are provided with protuberant threads or ridges at one side at a, b, c, d, e, f, and the tops of the teeth upon these bolt-blocks are substantially in the same cylindrical surface and the remainder of the periphery of each bolt-block constitutes a cylindrical surface having a smaller radius than that to which the thread and tooth tops extend.

The operating ring g surrounds the cage h and is provided with internal spur gear teeth y which mesh with the teeth on the rotatable bolt-blocks. Studs m, n, o, project radially from the ring g and serve as handles with which to operate the ring or, if need be, as projections to which a spanner may be applied. Two of these radial projections, namely, m and n, are bored out to the interior of the ring and serve as sockets for the retaining pins v, v', which are normally urged inward by the springs u, u', so that the rounded ends of these pins may, as occasion requires, be thrust into the spherical sockets w, w', formed in the outer periphery of the cage h. The remaining projection o is bored and tapped for the reception of the screw p which projects inwardly into a segmental slot x also formed in the cage h.

The annular cage h and the annulus i form in conjunction with each other a socket into which the threaded end of a complemental coupling member such as M (Fig. 1) may be inserted axially, provided the rotatable bolt-blocks A, B, C, D, E, F, are turned so as to present their peripheral portions of least radius at the openings of the recesses a', b', c', d', e', f', which open to the interior of the cage. When such a threaded complemental member is axially inserted in the socket formed by the cage h the ring g is given a turning movement which by reason of the gear connection with the bolt-blocks A, B, C, D, E, F, turns the latter, so that the protuberant threaded portions a, b, c, d, e, f, are made to project into the socket and thus intermesh with the threads of the previously axially inserted complemental coupling member M. When this is done the parts above described will be in the position shown in Fig. 2; the retaining pins v, v' will have automatically seated themselves in the sockets w, w' and the screw p will have traversed the length of the segmental slot x. To uncouple the above described socket member from the complemental member inserted in it, the ring g is given a rotative movement in the opposite direction, this movement being limited by the coöperation of the segmental slot x with the screw p, the spring controlled retaining pins v, v' slipping out of the sockets w, w' when the uncoupling movement is made.

The protuberant thread ridges a, b, c, d, e, f, are preferably given a lead which approximates to the lead or inclination of the pipe thread formed on the complemental coupling member M to be engaged by the said threaded portions of the blocks A, B, C, D, E, F. It is not, however, absolutely necessary that these protuberant threaded portions be given such a lead or any lead at all, since the slight clearance practically necessary will be ample to compensate for discrepancies in lead or inclination. In order to insure, as far as possible, the entrance of the threads or ridges between the threads on the coupling member M, the leading ends of these threads on the bolt-blocks are preferably tapered or sharpened as indicated at $a^2, b^2, c^2, d^2, e^2, f^2$. It may happen, however, that when the ring g is moved rotatively in order to establish mesh between the threaded protuberances in the rotative bolt-blocks and the threads of the complemental coupling member, the tops of these threads will be opposed in the case of one or more of the rotative blocks. In order to provide for this contingency the bolt-blocks are given longitudinal play in the recesses a', b', c', d', e', f', which contain them and in the seats which form the bearings for the trunnions, t, t', and each of the rotative blocks is axially bored through the greater part of its length in order to admit the shouldered pin r and the spring s. These springs are compressed between the shoulders on the pins r and the heads of the axial holes in the rotative blocks and exert an effort sufficient to overcome the weight of each block, so that the stress of these springs maintains the rotative blocks in contact with the surface of the annulus i. Thus, in case any one of the rotative blocks so meets the axially inserted complemental coupling member that the tops of threads come into opposition, the block readily yields in an axial direction opposite to the inserting movement of the complemental coupling member to allow the protuberant threads which constitute the gripping members or bolts on the rotative block to mesh with the threads on the inserted coupling member. Only those rotative blocks which in the act of coupling are seated firmly upon the annulus i will participate in the work of holding the two coupled members together; those rotative blocks which have yielded as above described, will remain idle. But with an arrangement such as herein shown where there are six rotative blocks arranged on the coupling member, the chance that more than two such rotative blocks will fail to operate actively is very small. Practically speaking no occasion can arise in which an insufficient number of rotative blocks will not coöperate actively to hold the complemental coupling member in the socket formed by the cage $h$ and annulus $i$.

As an external index of the position of the parts of the above described coupling member I provide a mark or depression such as $q$ (Fig. 3) formed in the rim of the annulus $i$, in such position that it stands adjacent to one of the projections on the ring $g$, say the projection $o$, when the rotative blocks in the interior are in locking or coupling position.

It will be observed that the locking movement of the protuberant threads $a$, $b$, $c$, $d$, $e$, $f$, is in the same direction referred to the axis of the coupling member as a whole as the normal right-handed screwing movement which would be given to the axially inserted screw-threaded coupling member M. Thus, the coupling movement of the threads $o$ indicated by the arrow 3 is in the same direction as the right-handed screwing movement of a complemental coupling member such as M indicated by the arrow 4 in (Fig. 2). Consequently, movement of either of the coupling members as a whole succeeding the movement of the ring $g$ upon the cage $h$ tends to bind the engaged threads firmly together and cannot operate to move the rotative bolt-blocks out of coupling position. Moreover, when water pressure is applied to the interior of coupling members, the straining of the axially inserted coupling members tends to tip the rotative bolt-blocks A, B, C, D, E, F, and consequently, binds the trunnions $t$, $t'$, in their bearings guarding still further against accidental uncoupling.

What I claim and desire to secure by Letters Patent is:

1. In a coupling member, an annular cage to receive a complemental threaded coupling member by axial relative movement, a plurality of rotatable bolt-blocks threaded to mesh with the threads of said complemental coupling-member, mounted in the cage with limited play parallel to the axis of the coupling member, and means to move the bolts relatively to the cage and intrude the bolt threads tangentially and progressively into mesh with the complemental member.

2. In a coupling member, an annular cage to receive a complemental threaded coupling member by axial relative movement, a plurality of bolt-blocks threaded to mesh with the threads of said complemental coupling-member, mounted in the cage with limited axial play, and means to move the bolts relatively to the cage and intrude the bolt threads tangentially and progressively into mesh with the complemental member, springs to urge the bolts yieldingly away from the entrance of the annular cage.

3. In a coupling member, an annular cage to receive a complemental threaded coupling member by axial relative movement, a plurality of bolt blocks threaded to mesh with the threads of said complemental coupling-member, mounted in the cage with limited axial play, springs to urge the bolts yieldingly away from the entrance of the annular cage, and means to move the bolts relatively to the cage and intrude the bolt threads tangentially and progressively into mesh with the complemental member, the leading ends of the bolt threads being tapered to insure entrance between the threads of the complemental coupling member.

4. In a coupling member, the combination of a plurality of rotatable bolt-blocks mounted with limited play in the direction of the axis of their rotation, threaded on one side to engage a threaded end of a complemental pipe coupling member and means to rotate the blocks to intrude their threaded sides into the space adapted to receive said complemental member.

5. In a coupling member, the combination of a plurality of rotatable bolt-blocks mounted with limited play in the direction of the axis of their rotation and provided each with a spring to urge it in axial direction, threaded on one side to engage a threaded end of a complemental pipe coupling member, and means to rotate the blocks to intrude their threaded sides into the space adapted to receive said complemental member.

6. In a coupling member, the combination of a plurality of rotatable bolt-blocks mounted with limited play in the direction of the axis of their rotation and provided each with a spring to urge it in axial direction away from an opening provided for a complemental coupling member, threaded on one side to engage a threaded end of the complemental coupling member, and means to rotate the blocks to intrude their threaded sides into the space adapted to receive said complemental member.

7. In a pipe coupling member, the combination of a plurality of rotatable bolt-blocks mounted with limited play in the direction of the axis of their rotation, threaded on one side to engage a threaded end of a complemental pipe coupling member, and toothed to mesh with an annular rack, said annular rack movable with relation to the rotatable blocks to rotate them and intrude their threaded sides into the space adapted to receive said complemental member.

8. In a pipe coupling member, the combination of a plurality of rotatable bolt-blocks mounted with limited play in the direction of the axis of their rotation and provided each with a spring to urge it in axial direction, threaded on one side to engage a threaded end of a complemental pipe coupling member, and toothed to mesh with an annular rack, said annular rack movable with relation to the rotatable blocks to rotate them and intrude their threaded sides into the space adapted to receive said complemental member.

9. In a coupling member, the combination of a plurality of rotatable bolt-blocks mounted with limited play in the direction of the axis of their rotation and provided each with a spring to urge it in axial direction away from the opening provided for the complemental coupling member, threaded on one side to engage a threaded end of a complemental pipe coupling member, and toothed to mesh with an annular rack, said annular rack movable with relation to the rotatable blocks to rotate them and intrude their threaded sides into the space adapted to receive said complemental member.

10. In a pipe coupling member, the combination of an annulus provided with a male-threaded coupling end and trunnion bearings, a ring secured to the annulus provided with chambers and trunnion seats in said chambers, rotatable bolt-blocks in said chambers, each provided with end trunnions of which one seats in a trunnion seat in the chambered ring and the other in a trunnion bearing in the coupling end, with protuberant threads on one side to engage the threaded end of a coupling member inserted in the ring and with an axially located spring cavity, springs in said cavities to urge the blocks toward the coupling end, and a collar embracing the chambered ring, and a gear connected with the rotatable blocks to rotate them and intrude their protuberant threads into the interior space embraced by the chambered ring.

Signed by me at Newport, New Hampshire, this twenty-ninth day of November, 1911.

LEON A. SCRIBNER.

Witnesses:
JOHN McCRILLIS,
L. MARGUERITE WILMARTH.

Copies of this patent may be obtained for five cents each, by addressing the "Commissioner of Patents, Washington, D. C."